J. McGregor,
Wood Plane Attachment.
Nº 1,690. Patented July 15, 1840.
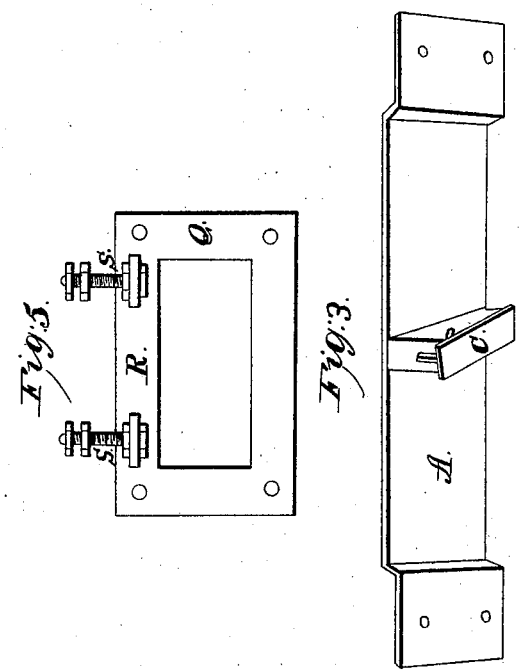
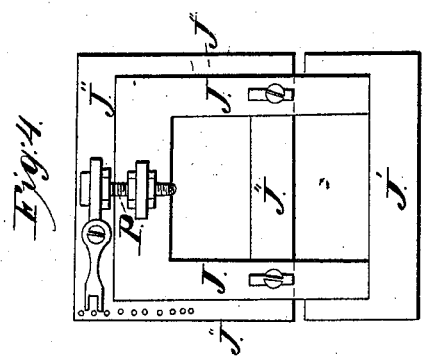

UNITED STATES PATENT OFFICE.

JAMES MacGREGOR, JR., OF SAVAGE FACTORY, ANNE ARUNDEL COUNTY, MARYLAND.

PLANING-MACHINE.

Specification of Letters Patent No. 1,690, dated July 15, 1840.

*To all whom it may concern:*

Be it known that I, JAMES MACGREGOR, Jr., of Savage Factory, Anne Arundel county, Maryland, have made certain improvements in the planing-machine for which I originally obtained Letters Patent of the United States under date of the 28th day of August, 1833, and for improvements on which I also obtained Letters Patent dated on the 9th day of January, 1838; and I hereby declare that the following is a full and exact description of the improvements made by me since the date of the last-named patent, which improvements are intended to be applied specifically to the said improved machine. I therefore refer to Figures 1 and 2 in the specification of that patent for the purpose of connecting my present improvements therewith.

My first improvement consists in a gage for setting the irons when they are to be replaced after being removed for the purpose of sharpening, by means of which gage they are at once set to the proper rake and rankness, so as to require little or no further adjustment. In Fig. 3, of the accompanying drawing, A, is a bar, or plate, of iron, which is placed across and attached to the frame or bed of my planing-machine immediately below the arms that carry the plane irons, at that part of said frame, or bed, where the irons are at their greatest elevation from the bed; that is to say directly opposite to that on which the plane irons operate on the plan to be planed. Upon the middle of the plate A there is a block or standard, B, the face of which has the same inclination which is to be given to the cutting edge of the plane iron, and to the top of this standard is adapted a plate of brass C, by which it is raised to the exact height for the line of the edges of the irons. This plate may be removed at pleasure, being secured, temporarily, to the iron standard by a pin, or otherwise. When the plane irons are to be set they are put into the slot, and lightly fastened in the arms, the brass plate is placed on the standard, and the arm which is to have the iron adjusted is brought immediately over it. The iron is then dropped or lowered into its place, its cutting edge resting on or nearly touching, the brass plate, in which position it is to be secured by the set screws. By this device, the operation is much facilitated.

My second improvement is in the manner of constructing the sliding frame which governs the grooving saw H, Figs. 1 and 2, in the specification of my patent of January, 1828. The sliding frame marked J, J, in those figures is similarly marked in its improved form in Fig. 4 of the drawing hereunto annexed. The improvement consists in the making of the frame J, J, in two parts, one of which is to slide upon the other, the lowermost being marked J″, J″, and in the adjusting of the sliding part J, J, by means of a set screw and nuts, as shown at P. By means of this mode of adjustment the grooving saw can be regulated with great precision, so as exactly to adjust it to the required depth of the groove. The other movements in this part remain as in my former patent. To the end J′, of this frame is attached the box, or collar, in which the shaft of the grooving saw runs. By the former arrangement of this saw frame, that degree of accuracy which is necessary to the perfect action of the machine was not attained, a difficulty which the adjusting screw P, and the nuts thereon, effectually obviate.

The tonguing saws, lettered C, C, in the drawing attached to my patent above named, I now adjust by means of a sliding frame with set screws operating in the same manner with that used for the grooving saw. Fig. 5, shows a sliding piece which constitutes the frame that supports the shaft of the tonguing saws; this piece is to stand vertically, the part marked Q, being its upper end, and that marked R, its front.

S, S, are the adjusting screws, with their nuts, which nuts are to embrace between them a fixed bar, or strip, of the general frame of the machine, and it will be evident that a perfect adjustment can thus be obtained.

Having thus described my additional improvements, what I claim therein is—

1. The construction and use of the gage for adjusting or setting to the proper rake and rankness the cutting or plane irons; the same being made and operating as herein fully set forth.

2. I claim the combining with the original sliding frame of the grooving saw of my planing machine, the adjusting frame, screw and nuts, in the manner and for the purpose set forth.

JAMES MacGREGOR, Jr.

Witnesses:
THOS. P. JONES,
ARON A. TENTLER.